United States Patent
Ryu et al.

(10) Patent No.: US 7,442,241 B2
(45) Date of Patent: Oct. 28, 2008

(54) INKJET INK COMPOSITION AND MULTI-COLOR INKJET INK SET HAVING THE SAME

(75) Inventors: Seung-min Ryu, Yongin-si (KR); Yeon-kyoung Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 297 days.

(21) Appl. No.: 11/468,108

(22) Filed: Aug. 29, 2006

(65) Prior Publication Data

US 2007/0081061 A1    Apr. 12, 2007

(30) Foreign Application Priority Data

Oct. 6, 2005    (KR) .................. 10-2005-0093992

(51) Int. Cl.
*C09D 11/02*    (2006.01)
*B41J 2/01*    (2006.01)

(52) U.S. Cl. .............. 106/31.27; 106/31.57; 106/31.58; 106/31.43; 347/100

(58) Field of Classification Search ............. 106/31.27, 106/31.57, 31.58, 31.43; 347/100
See application file for complete search history.

(56) References Cited

U.S. PATENT DOCUMENTS

| 5,560,771 | A | * | 10/1996 | Takemoto et al. | ........ | 106/31.58 |
| 7,094,278 | B2 | * | 8/2006 | Kwan et al. | .............. | 106/31.27 |
| 7,288,141 | B2 | * | 10/2007 | Sugimoto et al. | ........ | 106/31.27 |

FOREIGN PATENT DOCUMENTS

| JP | 07-305009 | 11/1995 |
| JP | 08-216403 | 8/1996 |
| JP | 2000-297234 | 10/2000 |
| JP | 2000-319562 | 11/2000 |

* cited by examiner

*Primary Examiner*—Helene Klemanski
(74) *Attorney, Agent, or Firm*—Stanzione & Kim, LLP (57) ABSTRACT

An inkjet ink composition including about 100 parts by weight of a liquid vehicle (such as water), about 1 to about 35 parts by weight of a colorant including first and second dyes, and about 0.1 to about 130 parts by weight of an organic solvent, and a weight of the first dye soluble in 100 parts by weight of water under standard state conditions is more than 1.5 times an initial weight of the first dye contained in 100 parts by weight of the inkjet ink composition and a weight of the second dye soluble in 100 parts by weight of water under the standard state conditions is less than 1.5 times an initial weight of the second dye contained in 100 parts by weight of the inkjet ink composition; and a multi-color inkjet ink set including the inkjet ink composition.

22 Claims, 2 Drawing Sheets

INKJET INK COMPOSITION AND MULTI-COLOR INKJET INK SET HAVING THE SAME

CROSS-REFERENCE TO RELATED APPLICATIONS

This application claims priority under 35 U.S.C. §119(a) from Korean Patent Application No. 10-2005-0093992, filed on Oct. 6, 2005, in the Korean Intellectual Property Office, the disclosure of which is incorporated herein in its entirety by reference.

BACKGROUND OF THE INVENTION

1. Field of the Invention

The present general inventive concept relates to an inkjet ink composition and a multi-color inkjet ink set having the same, and more particularly, to an inkjet composition in which a transparency and a clarity of a photo image that is printed using the inkjet ink composition are improved simultaneously with an optimization of a stability and flowing properties of the inkjet ink composition, and in which a water resistance is reinforced by improving a fusing property of the inkjet ink composition, and a multi-color inkjet ink set having the same.

2. Description of the Related Art

An inkjet recording apparatus displays an image on a medium by ejecting ink droplets through a nozzle. An inkjet ink should have excellent drying properties in a medium, should not cause image bleeding, should display uniform images regardless of a medium type, should not cause color bleeding at an interface between different colors when printing multi-colored images, and should have excellent durability (i.e., water resistance, light resistance, and rubbing resistance). Various attempts have been made to provide a multi-color inkjet ink set including at least two ink compositions that satisfy such requirements.

For example, U.S. Pat. No. 4,849,770 employs a reactive dye or a reactive dispersant dye to improve a fusing of a dye on a fabric, and U.S. Pat. No. 5,631,309 employs a polymer that can perform a decarboxylation reaction with an oil-soluble dye or a dispersant dye, thereby improving water resistance of an image. U.S. Pat. No. 5,631,309 describes that storage stability can be improved by preventing ink from fusing on an inkjet head through the decarboxylation of the polymer. U.S. Pat. No. 6,033,463 describes that a fusing of ink on a paper can be accelerated and a water resistance of an image can be enhanced by using a dye having a solubility of less than 10% when selecting a main dye constituting a color ink, as well as by controlling a surface tension of a black ink and a color ink in an ink set including a pigment black ink and a dye color ink. In addition, U.S. Pat. No. 6,536,893 describes that a water resistance is enhanced since a dispersant dye or a subliming dye is sublimed by heat and pressure, recrystallized on a medium, and then solidified into a water-insoluble dye.

However, the above-described conventional solvent and dispersant dyes have little or no solubility in water. Accordingly, when such dyes are used in a conventional water-soluble ink, a small percentage of up to 20% by weight of a polymer is used in order to enhance a dispersibility or miscibility of the conventional ink. However, since a viscosity of such a conventional ink is too high, the conventional ink does not flow smoothly in an inkjet cartridge and thus the conventional ink is not ejected uniformly. Accordingly, such a conventional ink cannot maintain ink droplet uniformity or ejection uniformity in high speed-and-quality printers realizing high frequency and several pl (picoliters) of small droplets. Also, since Brownian motion can occur easily due to the presence of a large amount of the added polymer, the conventional ink including the polymer may become thick, thereby decreasing a stability of the conventional ink, and a printed image can also lose a transparency and clarity of the dye ink due to the large amount of the polymer. Accordingly, an appropriate selection of a concentration of the polymer becomes important when using the conventional solvent or dispersant dyes.

On the other hand, when using a dye that is easily soluble in water in an ink, a stability of the ink is excellent due to the good solubility of the dye in water, but printed images can be easily dissolved in water, and thus a water resistance of the ink is low. As a result, bleeding between colors occurs due to a movement of ink droplets on media on which the printed images are printed. Accordingly, an ether penetrant is conventionally used in excessive amounts to accelerate a fusing of the ink in order to enhance the weak water resistance and reduce the bleeding of the ink. However, an image quality is quickly decreased and the bleeding of the ink also deteriorates since the ink does not stay at an upper layer of the media.

Thus, in an ink including a dye having a solubility of less than 10%, a concentration of the dye in the ink is increased from an initial concentration thereof due to an evaporation of water in the ink when the ink is stored in a storage container for a long period or the cartridge is used for a long period. An amount of the dye in the ink after evaporation can be more than 10% according to the initial concentration of the dye used in preparing the ink. Thus, since the dye is precipitated as a solid, the ink cannot be used due to a decreased stability of the ink, or cannot be ejected due to a clogging of the ink in the cartridge. Therefore, it is required that a solubility of a dye be optimized in consideration of a correlation with a concentration of the dye used in an ink.

SUMMARY OF THE INVENTION

The present general inventive concept provides an inkjet ink composition that satisfies various ink characteristics, a multi-color inkjet ink set including the inkjet ink composition, and a cartridge useable with an inkjet recording apparatus including the multi-color inkjet ink set.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an inkjet recording apparatus, including water, and a colorant including first and second dyes, in which a weight of the first dye soluble in 100 parts by weight of water under standard state conditions is more than 1.5 times an initial weight of the first dye contained in 100 parts by weight of the inkjet ink composition, and a weight of the second dye soluble in 100 parts by weight of water under standard state conditions is less than or equal to 1.5 times an initial weight of the second dye contained in 100 parts by weight of the inkjet ink composition.

The initial weight of the second dye contained in the inkjet ink composition may be less than 70% by weight of a weight total of the first dye and the second dye contained in the inkjet ink composition.

The initial weight of the first dye contained in the inkjet ink composition may be about 0.3 to about 30 parts by weight based on 100 parts by weight of the water. The initial weight of the first dye contained in the inkjet ink composition may be about 1 to about 7% by weight based on 100 parts by weight of the inkjet ink composition.

The first dye can be an acid dye, a direct dye, a reactive dye, and a basic dye. The first dye can be Direct Black 168, Direct Blue 199, Acid Blue 9, Direct Red 23, Reactive Red 180, Direct Yellow 86, and Direct Yellow 132.

The second dye can be a solvent dye, a dispersant dye, and a dye having a slightly high solubility. The second dye can be Acid Black 48, Acid Blue 25, Acid Blue 29, Acid Blue 40, Acid Green 27, Acid Orange 8, Acid Orange 74, Acid Red 4, Acid Red 88, Acid Red 106, Acid Yellow 42, Acid Blue 7, Mordant Red 3, Acramine Yellow, Basic Orange 21, and Basic Red 9.

The inkjet ink composition may further include an organic solvent. An amount of the organic solvent in the inkjet ink composition may be about 0.1 to about 130 parts by weight based on 100 parts by weight of the inkjet ink composition. The organic solvent can be at least one solvent selected from the group consisting of an alcoholic solvent, a ketone solvent, an ester solvent, a polyhydric solvent, a nitrogen-containing solvent, and a sulfur-containing solvent. The sulfur-containing solvent may include at least one of dimethyl sulfoxide, tetramethyl sulfone, and thioglycol.

The weight of the first dye soluble in 100 parts by weight of water under standard state conditions may be about 1.5 to about 85 times the initial weight of the first dye contained in 100 parts by weight of the inkjet ink composition.

The weight of the second dye soluble in 100 parts by weight of water under standard state conditions may be about 0.001 to about 1.5 times the initial weight of the second dye contained in 100 parts by weight of the inkjet ink composition.

The inkjet ink composition may further include at least one additive selected from the group consisting of a humectant, a dispersant, a surfactant, a viscosity controller, a pH controller, and an antioxidant. An amount of the at least one additive may be about 1 to about 50 parts by weight based on 100 parts by weight of the water.

An amount of the colorant in the inkjet ink may be is about 1 to about 35 parts by weight based on 100 parts by weight of the inkjet ink composition. An amount of the water in the inkjet ink composition may be 100 parts by weight based on 100 parts by weight of the inkjet ink composition.

The foregoing and/or other aspects and utilities of the present general inventive concept may also be achieved by providing a multi-color inkjet ink set including a first inkjet ink composition including water and a first colorant including first and second dyes, and a second inkjet ink composition including water and a second colorant including third and fourth dyes, in which a weight of the first dye soluble in 100 parts by weight of water under standard state conditions is more than 1.5 times an initial weight of the first dye contained in 100 parts by weight of the first inkjet ink composition, a weight of the second dye soluble in 100 parts by weight of water under standard state conditions is less than or equal to 1.5 times an initial weight of the second dye contained in 100 parts by weight of the first inkjet ink composition, a weight of the third dye soluble in 100 parts by weight of water under standard state conditions is more than 1.5 times an initial weight of the third dye contained in 100 parts by weight of the second inkjet ink composition, and a weight of the fourth dye soluble in 100 parts by weight of water under standard state conditions is less than or equal to 1.5 times an initial weight of the fourth dye contained in 100 parts by weight of the second inkjet ink composition.

The foregoing and/or other aspects and utilities of the present general inventive concept may also be achieved by providing a cartridge of an inkjet recording apparatus including the multi-color inkjet ink set.

The foregoing and/or other aspects and utilities of the present general inventive concept may also be achieved by providing an inkjet recording apparatus including the cartridge.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept provides an inkjet ink composition including a liquid vehicle (e.g., water), a colorant, and optionally an organic solvent, and provides a multi-color inkjet ink set including at least two of the inkjet ink compositions. The colorant may include a first dye (e.g., a water-soluble dye) and a second dye having a solubility lower than that of the first dye. In various embodiments of the present general inventive concept, the multi-color inkjet ink set may include at least two inkjet ink compositions having different colors.

The inkjet ink composition according to embodiments of the present general inventive concept may include about 100 parts by weight of the liquid vehicle (e.g., water), about 1 to about 35 parts by weight of the colorant, and about 0.1 to about 130 parts by weight of the organic solvent. The colorant may include at least a first dye and a second dye. A solubility of the first dye may be different from a solubility of the second dye in the liquid vehicle (e.g., water). For example, the first dye may be more soluble in the liquid vehicle (e.g., soluble in water) than the second dye. In particular, a weight of the first dye soluble in about 100 parts by weight of water under standard state conditions (i.e., 1 atm, 20° C.) may be more than 1.5 times an initial weight of the first dye contained in 100 parts by weight of the inkjet ink composition. On the other hand, a weight of the second dye soluble in 100 parts by weight of water under standard state conditions may be less than or equal to 1.5 times an initial weight of the second dye contained in 100 parts by weight of the inkjet ink composition.

When the inkjet ink composition according to the present embodiment of the present general inventive concept includes the at least two dyes having the different solubilities in the liquid vehicle (e.g., water), the inkjet ink composition satisfies various characteristics that cannot be satisfied only with a single component colorant. In particular, the inkjet ink composition according to the present embodiment ensures a stability of an ink containing the ink composition (thereby providing excellent storage stability over a long period), embodies transparent and clear colors suitable for photographic images, provides an excellent color concentration of the ink and bleeding characteristics, and enhances a water resistance and a drying speed by providing quick and excellent fusing properties to the ink.

An ink cartridge useable in an inkjet recording must ensure uniform ink ejection without nozzle clogging for at least 1 month to about 2 months when placed in air at an ambient temperature. When performing accelerated drying experiments at an ambient temperature after filling ink into an ink cartridge and then standing the ink cartridge for 2 months in air without completely closing a cartridge cover of the ink cartridge, most inks demonstrate up to 28 to 35% evaporation (i.e., evaporation of a liquid vehicle of the ink, such as water). If a maximum amount of the ink in this range is evaporated in the cartridge (i.e., if a maximum amount of the liquid vehicle, such as water, in this range is evaporated from the ink), a concentration of a dye contained in the ink is increased to 1.5 times an initial concentration of the dye in the ink.

When referring to a solubility of a dye contained in an ink that includes a liquid vehicle, the term "solubility" means a maximum concentration (or weight) of the dye, in weight percent, that can be dissolved in the liquid vehicle under standard state conditions (i.e., 1 atm and 20° C.).

Thus, if an ink cartridge contains an ink composition that includes an initial concentration of more than 5% by weight of a dye having less than 7% solubility in water is used for a long period of time in a hot region (such as the equator area), thereby reaching about 35% ink evaporation (i.e., 35% water evaporation from the ink), the dye concentration of the ink in the ink cartridge is relatively increased from the initial 5% by weight concentration to a final concentration of more than 7.7% by weight. Because the solubility of the dye in the water is less than 7% by weight, the final dye concentration of 7.7% by weight is out of range of the solubility of the dye in water under standard state conditions, and thus the dye is precipitated in the ink cartridge and the ink does not flow smoothly therefore.

On the other hand, if the ink cartridge contains an ink composition that includes an initial concentration of only about 3% by weight of the dye having the less than 7% solubility in water, the dye concentration of the ink in the ink cartridge is relatively increased from the initial 3% by weight concentration to a final concentration of 4.6% by weight. Because the solubility of the dye in the water is less than 7% by weight, the final dye concentration of 4.6% by weight is within the range of the solubility of the dye in water under standard state conditions. Thus, the dye is sufficiently solubilized and the stability of the ink can be maintained, even though 35% of the ink is evaporated (i.e., 35% of the liquid vehicle in the ink is evaporated) after using the ink for the long period of time in the hot region (such as the equator area).

Thus, in order to use ink for a desired period of time in all types of environments, a solubility (in weight percent) of at least one dye used in the ink should be higher than 1.5 times an initial concentration (in weight percent) of the at least one dye in the ink. When such a dye having a stable solubility (e.g., the at least one dye described above) is used alone in the ink (i.e., with no other dyes), the solubility of the dye remains suitable even if evaporation does not occur at all, and thus the dye can be solubilized in water even after a printed image is dried.

In order to enhance such a weak water resistance of the ink containing a first dye having a stable solubility, a high image quality may be maintained by controlling one or more dyes embodying colors themselves, rather than using a non-dye additive, such as a penetrant. Therefore, a second dye having a low or little solubility in the liquid vehicle of the ink (as compared to the solubility of the first dye) may be used together with the first dye. The second dye may be quickly solidified on a printing medium (e.g., paper) when the ink is deposited thereon, and after solidification, the second dye is not easily solubilized (in contrast to the first dye having the stable solubility and weak water resistance). Thus, when a second dye having a solubility (in weight percent) in a liquid vehicle of an ink of less than or equal to 1.5 times an initial concentration (in weight percent) thereof in the ink is used with a first dye having a solubility (in weight percent) of higher than 1.5 times an initial concentration (in weight percent) thereof ink the ink, the second dye can be solidified together with the ink when ink is deposited on the printing medium.

As discussed above, in an inkjet ink composition according to embodiments of the present general inventive concept, a weight of the first dye soluble in 100 parts by weight of water under standard state conditions (i.e., 1 atm, 20° C.) may be more than 1.5 times an initial weight of the first dye contained in 100 parts by weight of a total weight of the inkjet ink composition. Hereinafter, "the weight of the first dye soluble in 100 parts by weight of water" means the solubility of the first dye in water under the standard state conditions (STP; Standard Temperature and Pressure) that demonstrates unique physical properties of the first dye and at least one second dye contained in the inkjet ink composition. When a weight of a dye that is soluble in 100 parts by weight of water is higher than 1.5 times an initial weight of the dye contained in an ink composition, the dye is considered to have a high solubility in water. Conversely, when a weight of a dye that is soluble in 100 parts by weight of water is less than or equal to 1.5 times an initial weight of the dye contained in an ink composition, the dye is considered to have a low solubility in water.

Such a first dye having a high solubility in water may be, but is not limited to, an acid dye, a direct dye, a reactive dye or a basic dye. Specific examples of the first dye having a high solubility in water include, but are not limited to, Direct Black 168, Direct Blue 199, Acid Blue 9, Direct Red 23, Reactive Red 180, Direct Yellow 86, and Direct Yellow 132.

As discussed above, a dye having a high solubility in water is a dye having a weight soluble in 100 parts by weight of water that is more than 1.5 times an initial weight of the dye in 100 parts by weight of a weight of an inkjet ink composition containing the dye. For example, the weight of the first dye soluble in 100 parts by weight of water may be 1.5 to 85 times the initial weight of the first dye contained in 100 parts by weight of the total weight of the inkjet ink composition, according to embodiments of the present general inventive concept. If the weight ratio is less than or equal to 1.5, the stability of the inkjet ink composition may be reduced upon evaporation of the inkjet ink composition (i.e., upon evaporation of the water in the inkjet ink composition).

In embodiments of the present general inventive concept, an amount of the high solubility dye contained in the inkjet ink composition may be about 0.3 to about 30 parts by weight based on 100 parts by weight of the water. If the amount of the high solubility dye is less than about 0.3 parts by weight, a color density of an image printed using the inkjet ink composition may become too low. If the amount of the high solubility dye exceeds about 30 parts by weight, the stability of the inkjet ink composition may be lowered.

As discussed above, a weight of the low solubility dye soluble in 100 parts by weight of water under the standard state conditions is less than 1.5 times an initial weight of the low solubility dye contained in 100 parts by weight of the total weight of the inkjet ink composition. The phrase "low solubility dye" is not limited to meaning "difficult to be solubilized" or "insoluble," but encompasses dyes having a relatively lower solubility as compared to the solubility of the high solubility dye.

Examples of such a low solubility dye include, but are not limited to, a solvent dye, a dispersant dye, a dye having a slightly high solubility, and a dye containing a number of aromatic rings or hydrophobic groups or a number of resonance structures providing the dye with a low solubility. More particularly, examples of such a second dye include, but are not limited to, Acid Black 48 (solubility of 20 mg/ml), Acid Blue 25 (solubility of 10 mg/ml), Acid Blue 29 (solubility of 20 mg/ml), Acid Blue 40 (solubility of lower than 0.1 mg/ml), Acid Green 27 (solubility of 30 mg/ml), Acid Orange 8 (solubility of 30 mg/ml), Acid Orange 74 (solubility of 20 mg/ml), Acid Red 4 (solubility of 40 mg/ml), Acid Red 88 (solubility of 30 mg/ml), Acid Red 106 (solubility of 20 mg/ml), Acid Yellow 42 (solubility of 30 mg/ml), Acid Blue 7 (solubility of 20 mg/ml), Mordant Red 3 (solubility of 20 mg/ml), Acramine Yellow (solubility of 8 mg/ml), Basic Orange 21 (solubility of 30 mg/ml), Basic Red 9 (solubility of 3 mg/ml), and similar dyes thereto.

The low solubility dye can enhance the stability of ink in water by including a dispersant having a molecular weight of less than 10,000 or a surfactant having a molecular weight of less than several thousands (e.g., less than 3,000) to enhance a dispersibility or miscibility of the low solubility dye in the ink. The dispersant may be, for example, polyvinyl alcohol, polybutyl methacrylate, and the like. Also, the low solubility dye may be first dissolved in an organic solvent having a high solubility, and then slowly added to an ink intermediate including a high solubility dye, to prepare a desired water-soluble ink.

The low solubility dye may decrease the stability of the inkjet ink composition since the low solubility dye is precipitated as a solid due to the low solubility thereof. Accordingly, an amount of the low solubility dye should be limited. For this reason, a weight of the low solubility dye contained in the inkjet ink composition should not exceed 70% by weight based on a sum of the weight of the high solubility dye and the weight of the low solubility dye contained in the inkjet ink composition. For example, the weight of the low solubility dye in the inkjet ink composition may be in a range of about 10 to about 50% by weight based on the sum of the weights of the high and low solubility dyes (i.e., based on a weight of the colorant).

If a concentration of the low solubility dye in the inkjet ink composition is higher than a concentration of the high solubility dye in the inkjet ink composition, then the stability of the inkjet ink composition might decrease over time, even when the inkjet ink composition is used at an ambient temperature. Accordingly, an amount of the low solubility dye in the inkjet ink composition should be more than about 10% of the solubility of the low solubility dye, and should not exceed 70% by weight of the sum of the weights of the first and second dyes. For example, the amount of the low solubility dye in the inkjet ink composition may be more than about 10% of the solubility of the low solubility dye, and may be below about 50% by weight of the sum of the weights of the first and second dyes. When the amount of the low solubility dye is less than about 10% of the solubility of the low solubility dye, an effect of the low solubility dye may be trivial. In particular, it is beneficial that the amount of the high solubility dye is increased in order to enhance a transparency and a clearness of photo images produced using the inkjet ink composition including the high and low solubility dyes, according to an embodiment of the present general inventive concept.

The inkjet ink composition according to embodiments of the present general inventive concept may include at least one organic solvent. The organic solvent may be at least one solvent selected from the group consisting of an alcoholic solvent, a ketone solvent, an ester solvent, a polyhydric solvent, a nitrogen-containing solvent, and a sulfur-containing solvent (such as dimethyl sulfoxide, tetramethyl sulfone, and thioglycol). An amount of the organic solvent in the inkjet ink composition may be about 0.1 to about 130 parts by weight based on 100 parts by weight of the inkjet ink composition. If the amount of the organic solvent is less than about 0.1 parts by weight, the inkjet ink composition is quickly evaporated such that the stability of the inkjet ink composition may be reduced. If the amount of the organic solvent exceeds about 130 parts by weight, a viscosity of the inkjet ink composition may be increased, thereby decreasing an ejecting performance of the inkjet ink composition.

The alcoholic solvent may be, for example, at least one member selected from the group consisting of methyl alcohol, ethyl alcohol, n-propyl alcohol, isopropyl alcohol, n-butyl alcohol, sec-butyl alcohol, t-butyl alcohol, and isobutyl alcohol. The ketone solvent may be, for example, at least one member selected from the group consisting of acetone, methylethyl ketone, and diacetone alcohol. The ester solvent may be, for example, at least one member selected from the group consisting of methyl acetate, ethyl acetate, and ethyl lactate. The polyhydric alcohol solvent may be, for example, at least one member selected from the group consisting of ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, and trimethylolpropane ethoxylate.

The nitrogen-containing solvent may be, for example, at least one member selected from the group consisting of 2-pyrrolidone and N-metyl-2-pyrrolidone. The sulfur-containing solvent may be, for example, at east one member selected from the group consisting of dimethyl sulfoxide, tetramethylene sulfone, and thioglycol.

According to embodiments of the present general inventive concept, the inkjet ink composition may further include various additives to reinforce properties thereof. In particular, the inkjet ink composition may include, for example, about 1 to about 50 parts by weight of at least one additive selected from the group consisting of a humectant, a dispersant, a surfactant, a viscosity controller, a pH controller, and an antioxidant.

More than two types of inkjet ink compositions according to embodiments of the present general inventive concept can be used together in an inkjet ink set. Such an inkjet ink set can be supplied via an ink receiving part of an inkjet recording apparatus or an inkjet printer cartridge. An inkjet recording apparatus according to an embodiment of the present general inventive concept can include a thermal head to eject ink droplets by vapor pressure by heating the inkjet ink compositions of the inkjet ink set, a piezoelectric head to eject ink droplets using a piezoelectric device, a disposable head, or a permanent head. Further, the inkjet recording apparatus can be a scanning type printer or an array type printer, and can be used in desktop computers, textile applications, and in other industries. The head type, the printer type, and the use thereof are mentioned for illustrative purposes only, and thus the present general inventive concept is not limited to the examples described above.

Figure 1:
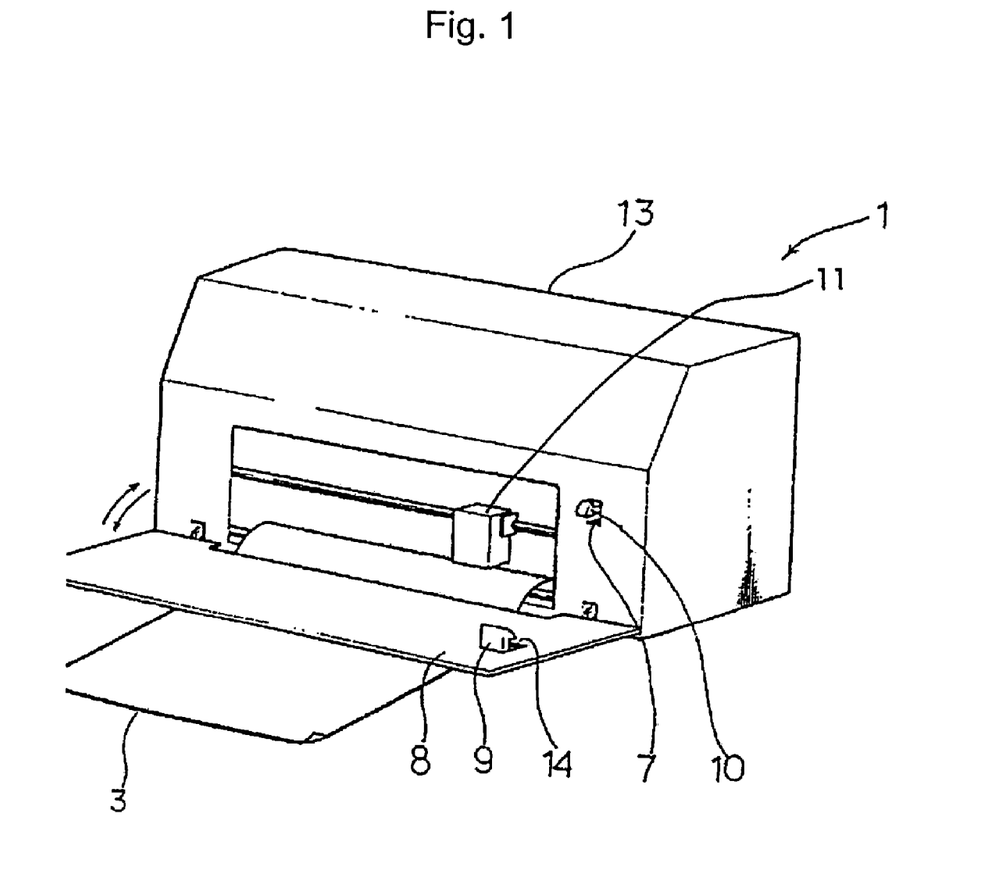
FIG. 1 is a perspective view illustrating an inkjet recording apparatus, according to an embodiment of the present general inventive concept.

FIG. 1 is a perspective view illustrating an inkjet recording apparatus 1, according to an embodiment of the present general inventive concept.

Referring to FIG. 1, the inkjet recording apparatus 1 according to the current embodiment of the present general inventive concept includes an inkjet printer cartridge 11 having an ink composition comprising a huge chromophore-containing colorant and a colorant-like additive. A printer cover 8 is connected through a hinge with a main body 13 of the inkjet recording apparatus 1. A portion of a moving latch 10 protudes through a hole 7. A fixed latch 9 is connected to an inside of the printer cover 8, and when the printer cover 8 is closed, the moving latch 10 engages with the fixed latch 9. The printer cover 8 has a recess 14 corresponding to the portion of the moving latch 10 protruding through the hole 7. The inkjet printer cartridge 11 is mounted in the main body 13 and ink is ejected onto a printing medium (e.g., a sheet of paper) 3 passing through a lower part of the inkjet recording apparatus 1.

Figure 2:
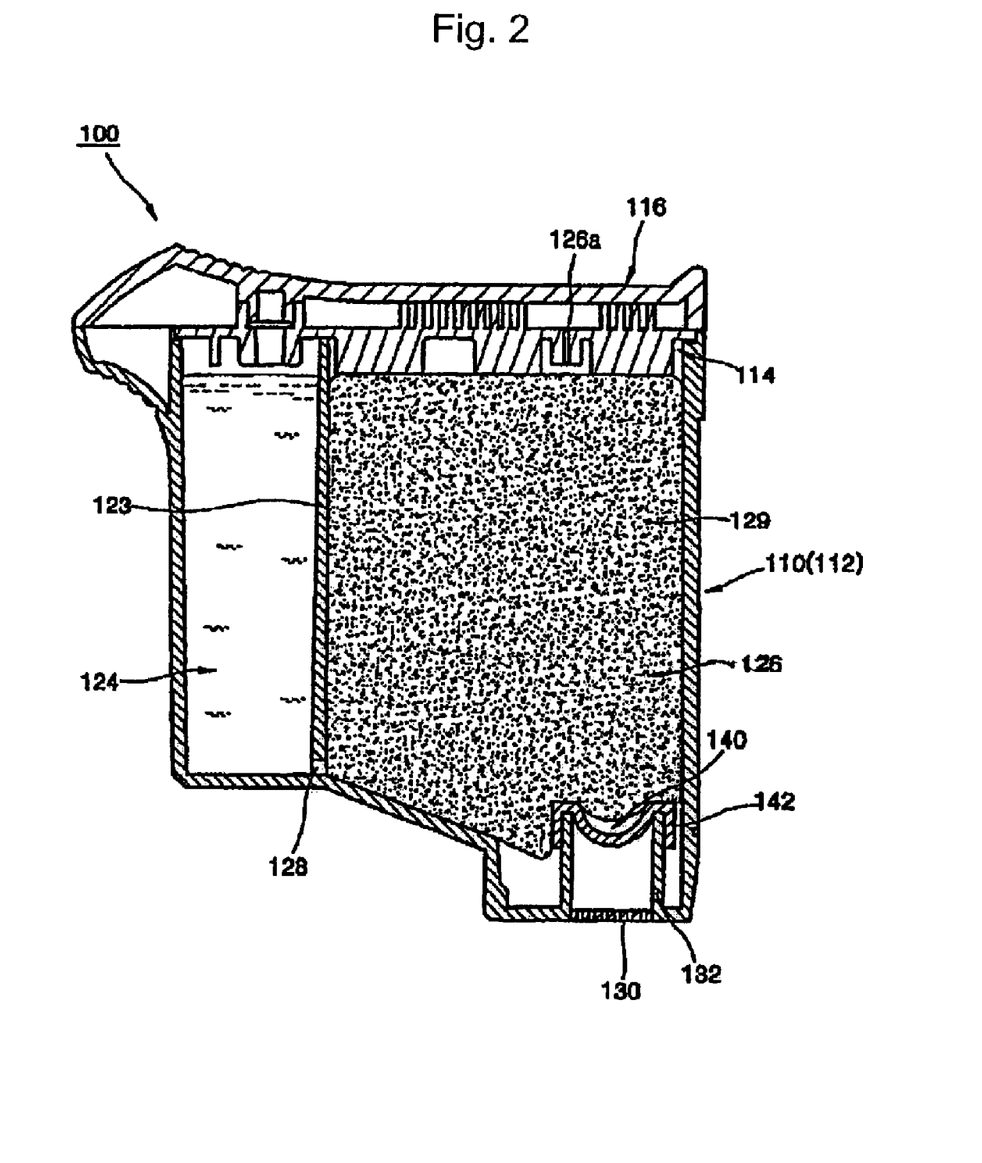
FIG. 2 is a sectional view illustrating an inkjet printer cartridge including an ink set, according to an embodiment of the present general inventive concept.

FIG. 2 is a sectional view illustrating an inkjet printer cartridge 100 including an ink composition, according to an embodiment of the present general inventive concept. The inkjet printer cartridge 100 includes a main body 110 forming an ink receiver 112, an inner cover 114 covering the top region of the ink receiver 112, and an outer cover 116 spaced apart from the inner cover 114 by a predetermined gap and sealing the ink receiver 112 and the inner cover 114.

The ink receiver 112 is divided into a first chamber 124 and a second chamber 126 by a vertical barrier wall 123. An ink passage 128 is formed in a lower area of the vertical barrier wall 123 between the first chamber 124 and the second chamber 126. The ink composition is filled into the first chamber 124, and then into a sponge 129 within the second chamber 126. A vent hole 126a corresponding to the second chamber 126 is formed in the inner cover 114.

A filter 140 to prevent an ejection hole 130 of a printer head from clogging is formed in a lower part of the second chamber 126 to filter impurities and minute bubbles in the ink. A hook 142 is formed in an edge region of the filter 140 and coupled to a top portion of a standpipe 132. The ink composition in the ink receiver 112 passes through the ejection hole 130 of the printer head and is ejected in small droplets on a printing medium.

The present general inventive concept will be described in greater detail with reference to the following examples and comparative examples. The following examples and comparative examples are for illustrative purposes only and are not intended to limit the scope of the general inventive concept.

EXAMPLE 1

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Blue 199 | 4 g |
| (manufactured by Avecia Co., solubility of 10%) | |
| Acid Blue 29 | 1.5 g |
| (manufactured by Aldrich Co., solubility of 2%) | |
| Ethylene glycol | 8 g |
| N-Methyl pyrrolidone | 8 g |
| Surfynol 465 | 2.2 g |
| Deionized water | 76.3 g |

EXAMPLE 2

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Black 168 | 3.6 g |
| (manufactured by Eastwell Co., solubility of 15%) | |
| Acid Black 48 | 1.4 g |
| (manufactured by Aldrich Co., solubility of 2%) | |
| Diethylene glycol | 10 g |
| 2-Pyrrolidone | 6 g |
| Surfynol 465 | 1.0 g |
| Deionized water | 78.0 g |

EXAMPLE 3

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Reactive Red 180 | 4 g |
| (manufactured by Eastwell Co., solubility of 15%) | |
| Basic Red 9 | 0.2 g |
| (manufactured by Aldrich Co., solubility of 0.3%) | |
| Ethylene glycol | 4 g |
| Diethylene glycol | 6 g |
| N-methyl pyrrolidone | 6 g |
| Polybutylmethacrylate | 0.1 g |
| Surfynol 465 | 0.8 g |
| Deionized water | 78.9 g |

EXAMPLE 4

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Yellow 132 | 2.5 g |
| (manufactured by Eastwell Co., solubility of 10%) | |
| Acid Yellow 42 | 2 g |
| (manufactured by Aldrich Co., solubility of 3%) | |
| 1,5-pentanediol | 8 g |
| 2-Pyrrolidone | 8 g |
| Tween 20 | 1 g |
| Deionized water | 78.5 g |

EXAMPLE 5

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Blue 199 | 4.5 g |
| (manufactured by Avecia Co., solubility of 10%) | |
| Acid Blue 25 | 0.8 g |
| (manufactured by Aldrich Co., solubility of 1%) | |
| Diethylene glycol | 6 g |
| N-methyl pyrrolidone | 10 g |
| Tween 20 | 1 g |
| Deionized water | 77.7 g |

COMPARATIVE EXAMPLE 1

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Blue 199 | 5 g |
| (manufactured by Avecia Co., solubility of 10%) | |
| Ethylene glycol | 2 g |
| Diethylene glycol | 7 g |
| 2-Pyrrolidone | 10 g |
| Surfynol 465 | 1.2 g |
| Deionized water | 74.8 g |

COMPARATIVE EXAMPLE 2

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Blue 199 | 5 g |
| (manufactured by Avecia Co., solubility of 10%) | |
| Acid Blue 29 | 0.1 g |
| (manufactured by Aldrich Co., solubility of 2%) | |
| Ethylene glycol | 8 g |
| N-methyl pyrrolidone | 8 g |
| Surfynol 465 | 2.2 g |
| Deionized water | 76.7 g |

COMPARATIVE EXAMPLE 3

A colorant, water, an organic solvent, and other additives were mixed in the following weights, and the mixture was stirred for at least 30 minutes until the mixture reached a homogeneous state. Then, the mixture was filtered through a 0.45 μm filter to obtain an ink composition.

| | |
|---|---|
| Direct Black 168 | 1.2 g |
| (manufactured by Eastwell Co., solubility of 15%) | |
| Acid Black 48 | 3.8 g |
| (manufactured by Aldrich Co., solubility of 2%) | |
| Joncryl 61 (MW: 8,500) | 3.0 g |
| Ethylene glycol | 4 g |
| Diethylene glycol | 5 g |
| 2-Pyrrolidone | 6 g |
| Surfynol 465 | 1.0 g |
| Deionized water | 76.0 g |

The inkjet ink compositions obtained from Examples 1 to 5 and Comparative Examples 1 to 3 were examined using the following evaluation standards, and the results of the examinations are described in Table 1 below.

EXPERIMENTAL EXAMPLE 1

Storage Stability of Ink 100 ml of the inkjet ink compositions obtained from Examples 1-5 and Comparative Examples 1-3 were respectively placed into heat resistant vials, the openings of the vials were closed, and the vials were stored in an incubator at 60° C. After 2 months, the vials were checked to determine whether precipitates were formed in, or ink layers were separated at, bottoms of the vials. The results are described in Table 1 below, according to the following criteria:

After standing for 2 months at ambient temperature, no layer separation: ◎

After standing for 2 months at ambient temperature, vial got cloudy, however, got clear soon after shaking: ○

After standing for 2 months at ambient temperature, vial got cloudy, and did not get clear even after shaking: Δ

After standing for 2 months at ambient temperature, ink layers were completely separated: X.

EXPERIMENTAL EXAMPLE 2

Drying Characteristics at Ambient Temperature

The inkjet ink compositions obtained from Examples 1-5 and Comparative Examples 1-3 were refilled in ink cartridges C-60 (Samsung Electronics Co., Ltd.), the ink cartridges were not completely closed, and the ink cartridges were stored for 2 months exposed to air. Then, accelerated drying experiments were performed on the ink cartridges. The results are described in Table 1 below, according to the following criteria:

After evaluation of accelerated drying, no solid precipitation: ◎

After evaluation of accelerated drying, vial got cloudy, however, got clear soon after shaking: ○

After evaluation of accelerated drying, vial got cloudy, and did not get clear even after shaking: Δ

After evaluation of accelerated drying, ink layers were completely separated: X.

EXPERIMENTAL EXAMPLE 3

Test for Nozzle Clogging

The inkjet ink compositions obtained from Examples 1-5 and Comparative Examples 1-3 were refilled in ink cartridges C-60 (Samsung Electronics Co., Ltd.). Then, each of the ink cartridges was used to print an image to test for nozzle clogging. After standing for 2 weeks at ambient temperature (25° C.) and low temperature (−18° C.) in a printer (MJC-3300p, Samsung Electronics Co., Ltd.), a number of times required to clean nozzles of the ink cartridges to print normally was determined, and the results are described in Table 1 below, according to the following criteria:

Normal printing was possible after cleaning nozzles once: ◎

Normal printing was possible after cleaning nozzles 2 to 4 times: ○

Normal printing was possible after cleaning nozzles 5 to 10 times: Δ

Normal printing was not possible even after cleaning nozzles 11 times: X.

EXPERIMENTAL EXAMPLE 4

Test for Water Resistance

The inkjet ink compositions obtained from Examples 1-5 and Comparative Examples 1-3 were refilled in ink cartridges C-60 (Samsung Electronics Co., Ltd.). Then, bar pictures were printed (2*10 cm) using a printer (MJC-3300p, Samsung Electronics Co., Ltd.) and initial OD values were determined for each of the bar pictures. 5 droplets of water were added to the bar pictures 5 minutes after the printing was completed, the bar pictures to which the water was added were dried for 24 hours, and subsequent OD values were determined for each of the dried bar pictures. The initial and subsequent OD values were compared, and the results are described in Table 1 below, according to the following criteria:

Less than 10% of original image was dehydrated: ◎

11 to 20% of original image was dehydrated: ○

21 to 40% of original image was dehydrated: Δ

More than 41% of original image was dehydrated: X.

EXPERIMENTAL EXAMPLE 5

Smear

The inkjet ink compositions obtained from Examples 1-5 and Comparative Examples 1-3 were refilled in ink cartridges C-60 (Samsung Electronics Co., Ltd.). Then, immediately after printing bar pictures (2*10 cm) on printing media using a printer (MJC-3300p, Samsung Electronics Co., Ltd.), papers were attached to printed surfaces of the print media, and initial OD values were determined for each of the bar pictures. Then, the bar pictures were passed through a press roll tester. Subsequent OD values of the images transferred from the bar pictures were compared with those of the original bar pictures, and the results are described in Table 1 below, according to the following criteria:

Less than 10% of original image was transferred: ◎

11 to 20% of original image was transferred: ○

21 to 40% of original image was transferred: Δ

More than 41% of original image was transferred: X.

EXPERIMENTAL EXAMPLE 6

Bleeding

The inkjet ink compositions obtained from Examples 1-5 and Comparative Examples 1-3 were refilled in ink cartridges C-60 (Samsung Electronics Co., Ltd.). Then, 30 minutes after printing test patterns using a printer (MJC-3300p, Samsung Electronics Co., Ltd.) including an M-50 black ink cartridge (Samsung Electronics Co., Ltd.), a degree of bleeding at an interface between two colors was evaluated, and the results are described in Table 1 below, according to the following criteria (1 dot diameter=100 μm when a standard of 600 dpi is used):

TABLE 1

| | Storage stability of ink | Drying characteristic at ambient temperature | Test for nozzle clogging | Water resistance | Smear | Bleeding |
|---|---|---|---|---|---|---|
| Example 1 | ○ | ◎ | ○ | ◎ | ◎ | ◎ |
| Example 2 | ◎ | ◎ | ◎ | ○ | ○ | ○ |
| Example 3 | ○ | ○ | ○ | ◎ | ○ | ◎ |
| Example 4 | ◎ | ◎ | ○ | ○ | ◎ | ◎ |
| Example 5 | ◎ | ○ | ◎ | ○ | ◎ | ○ |
| Comp. Example 1 | ◎ | ◎ | ◎ | X | X | Δ |
| Comp. Example 2 | ◎ | ◎ | ◎ | X | X | Δ |
| Comp. Example 3 | Δ | X | X | ◎ | ◎ | — |

Grade 5: no bleeding at the interface.
Grade 4: bleeding occurred corresponding to a width of 1 dot diameter.
Grade 3: bleeding occurred corresponding to a width of 2 dot diameters.
Grade 2: bleeding occurred corresponding to a width of 3 dot diameters.
Grade 1: bleeding occurred corresponding to a width of 4 or more dot diameters;
Higher than or equal to Grade 4: ◎
Grade 3: ○
Grade 2: Δ
Grade 1: X.

From Table 1, it can be seen that the inkjet ink compositions 1-5 according to embodiments of the present general inventive concept do not cause much separation of ink layers, do not precipitate a solid, and do not cause nozzle clogging even when stored for a long period, thus improving storage stability and flowing properties over a long period of time. Furthermore, the inkjet ink compositions 1-5 according to embodiments of the present general inventive concept also enhance water resistance due to improved fusion properties and decrease color bleeding by controlling ink flow.

As mentioned above, inkjet ink compositions according to various embodiments of the present general inventive concept can have enhanced properties compared to conventional inkjet ink compositions, can constitute an inkjet ink set having at least two colors, and can be used in an improved inkjet ink cartridge and an inkjet recording apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An inkjet ink composition, comprising:
    water; and
    a colorant comprising first and second dyes;
    wherein a weight of the first dye soluble in 100 parts by weight of water under standard state conditions is more than 1.5 times an initial weight of the first dye contained in 100 parts by weight of the inkjet ink composition, and a weight of the second dye soluble in 100 parts by weight of water under standard state conditions is less than or equal to 1.5 times an initial weight of the second dye contained in 100 parts by weight of the inkjet ink composition.

2. The inkjet ink composition of claim 1, wherein the initial weight of the second dye contained in the inkjet ink composition is less than 70% by weight of a total weight of the first dye and the second dye contained in the inkjet ink composition.

3. The inkjet ink composition of claim 1, wherein the initial weight of the first dye contained in the inkjet ink composition is about 1 to about 7% by weight based on 100 parts by weight of the inkjet ink composition.

4. The inkjet ink composition of claim 1, wherein the first dye comprises at least one dye selected from the group consisting of an acid dye, a direct dye, a reactive dye, and a basic dye.

5. The inkjet ink composition of claim 1, wherein the first dye comprises at least one dye selected from the group consisting of Direct Black 168, Direct Blue 199, Acid Blue 9, Direct Red 23, Reactive Red 180, Direct Yellow 86, and Direct Yellow 132.

6. The inkjet ink composition of claim 1, wherein the second dye has a lower solubility in water than a solubility of the first dye in water.

7. The inkjet ink composition of claim 1, wherein the second dye comprises at least one dye selected from the group consisting of a solvent dye and a dispersible dye.

8. The inkjet ink composition of claim 1, wherein the second dye comprises at least one dye selected from the group consisting of Acid Black 48, Acid Blue 25, Acid Blue 29, Acid Blue 40, Acid Green 27, Acid Orange 8, Acid Orange 74, Acid Red 4, Acid Red 88, Acid Red 106, Acid Yellow 42, Acid Blue 7, Mordant Red 3, Acramine Yellow, Basic Orange 21, and Basic Red 9.

9. The inkjet ink composition of claim 1, further comprising:
    an organic solvent.

10. The inkjet ink composition of claim 9, wherein an amount of the organic solvent in the inkjet ink composition is about 0.1 to about 130 parts by weight based on 100 parts by weight of the inkjet ink composition.

11. The inkjet ink composition of claim 9, wherein the organic solvent comprises at least one solvent selected from the group consisting of an alcoholic solvent, a ketone solvent, an ester solvent, a polyhydric solvent, a nitrogen-containing solvent, and a sulfur-containing solvent.

12. The inkjet ink composition of claim 11, wherein the sulfur-containing solvent comprises at least one member selected from the group consisting of dimethyl sulfoxide, tetramethyl sulfone, and thioglycol.

13. The inkjet ink composition of claim 1, wherein the weight of the first dye soluble in 100 parts by weight of water under standard state conditions is about 1.5 to about 85 times the initial weight of the first dye contained in 100 parts by weight of the inkjet ink composition.

14. The inkjet ink composition of claim 1, wherein the weight of the second dye soluble in 100 parts by weight of water under standard state conditions is about 0.001 to about 1.5 times the initial weight of the second dye contained in 100 parts by weight of the inkjet ink composition.

15. The inkjet ink composition of claim 1, further comprising:
    at least one additive selected from the group consisting of a humectant, a dispersant, a surfactant, a viscosity controller, a pH controller, and an antioxidant.

16. The inkjet ink composition of claim 15, wherein an amount of the at least one additive in the inkjet ink composition is about 1 to about 50 parts by weight based on 100 parts by weight of the water.

17. The inkjet ink composition of claim 1, wherein an amount of the water in the inkjet ink composition is 100 parts by weight based on 100 parts by weight of the inkjet ink composition.

18. The inkjet ink composition of claim 1, wherein an amount of the colorant in the inkjet ink composition is about 1 to about 35 parts by weight based on 100 parts by weight of the inkjet ink composition.

19. An inkjet ink composition of claim 1, wherein the initial weight of the first dye contained in the inkjet ink composition is about 0.3 to about 30 parts by weight based on 100 parts by weight of the water.

20. A multi-color inkjet ink set, comprising:
    a first inkjet ink composition comprising water, and a first colorant comprising first and second dyes; and
    a second inkjet ink composition comprising water, and a second colorant comprising third and fourth dyes,
    wherein:
        a weight of the first dye soluble in 100 parts by weight of water under standard state conditions is more than 1.5 times an initial weight of the first dye contained in 100 parts by weight of the first inkjet ink composition,
        a weight of the second dye soluble in 100 parts by weight of water under standard state conditions is less than or equal to 1.5 times an initial weight of the second dye contained in 100 parts by weight of the first inkjet ink composition, a weight of the third dye soluble in 100 parts by weight of water under standard state conditions is more than 1.5 times an initial weight of the third dye contained in 100 parts by weight of the second inkjet ink composition, and a weight of the fourth dye soluble in 100 parts by weight of water under standard state conditions is less than or equal to 1.5 times an initial weight of the fourth dye contained in 100 parts by weight of the second inkjet ink composition.

21. A cartridge of an inkjet recording apparatus comprising the multi-color inkjet ink set of claim 20.

22. An inkjet recording apparatus comprising the cartridge of claim 21.

* * * * *